United States Patent
Lin

(10) Patent No.: US 11,405,159 B2
(45) Date of Patent: Aug. 2, 2022

(54) METHOD FOR TRANSMITTING FEEDBACK INFORMATION, TERMINAL DEVICE AND NETWORK DEVICE

(71) Applicant: Guangdong OPPO Mobile Telecommunications Corp., Ltd., Guangdong (CN)

(72) Inventor: Yanan Lin, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 99 days.

(21) Appl. No.: 16/488,012

(22) PCT Filed: Feb. 24, 2017

(86) PCT No.: PCT/CN2017/074832
§ 371 (c)(1),
(2) Date: Aug. 22, 2019

(87) PCT Pub. No.: WO2018/152790
PCT Pub. Date: Aug. 30, 2018

(65) Prior Publication Data
US 2021/0135829 A1 May 6, 2021

(51) Int. Cl.
*H04L 5/00* (2006.01)
*H04L 1/16* (2006.01)
(Continued)

(52) U.S. Cl.
CPC .......... *H04L 5/0055* (2013.01); *H04L 1/1614* (2013.01); *H04L 1/1858* (2013.01); *H04L 1/1864* (2013.01); *H04W 72/0413* (2013.01)

(58) Field of Classification Search
CPC ... H04L 1/1614; H04L 1/1858; H04L 1/1864; H04L 5/0055; H04W 72/0413
See application file for complete search history.

(56) References Cited

U.S. PATENT DOCUMENTS

2009/0313516 A1* 12/2009 Shin .................. H04L 1/0009
714/748
2010/0182949 A1 7/2010 Ji
(Continued)

FOREIGN PATENT DOCUMENTS

| CN | 101674164 A | 3/2010 |
| CN | 102136894 A | 7/2011 |

(Continued)

OTHER PUBLICATIONS

English translation of China OA for CN 201780087414.4 mailed Jun. 28, 2020.
(Continued)

*Primary Examiner* — Brian P Cox
(74) *Attorney, Agent, or Firm* — Young Basile Hanlon & MacFarlane, P.C.

(57) ABSTRACT

A method for transmitting feedback information, a terminal device, and a network device are provided. The method includes: a terminal device determines a target feedback mode used for transmitting feedback information, wherein the feedback information is feedback information for a transport block (TB) sent by a network device and received by the terminal device; and the terminal device uses the target feedback mode to transmit the feedback information.

20 Claims, 3 Drawing Sheets

200

S210 — A terminal device determines a target feedback mode used for transmitting feedback information, and the feedback information is feedback information for a transport block (TB) sent by a network device and received by the terminal device S220 — The terminal device uses the target feedback mode to transmit the feedback information

(51) Int. Cl.
*H04L 1/18* (2006.01)
*H04W 72/04* (2009.01)

(56) References Cited

U.S. PATENT DOCUMENTS

| | | | |
|---|---|---|---|
| 2011/0246840 | A1 | 10/2011 | Khoshnevis et al. |
| 2012/0093040 | A1* | 4/2012 | Wu .................. H04W 72/1268 370/279 |
| 2014/0003374 | A1 | 1/2014 | Kuo |
| 2014/0362797 | A1* | 12/2014 | Aiba .................... H04L 1/1861 370/329 |
| 2014/0376358 | A1 | 12/2014 | Eder et al. |
| 2016/0233999 | A1* | 8/2016 | Chendamarai Kannan ................. H04L 5/0055 |
| 2019/0165893 | A1* | 5/2019 | Khosravirad ..... H03M 13/6306 |

FOREIGN PATENT DOCUMENTS

| | | |
|---|---|---|
| CN | 102148672 A | 8/2011 |
| CN | 103107869 A | 5/2013 |
| CN | 104168602 A | 11/2014 |
| CN | 104283651 A | 1/2015 |
| CN | 105024781 A | 11/2015 |
| CN | 106301670 A | 1/2017 |
| EP | 2309787 A1 | 4/2011 |
| JP | 2010213067 A | 9/2010 |
| RU | 2517191 C2 | 5/2014 |
| WO | 2010109521 A1 | 9/2010 |
| WO | 2011020439 A1 | 2/2011 |
| WO | 2014000221 A1 | 1/2014 |
| WO | 2016126653 A1 | 8/2016 |
| WO | 2018002410 A1 | 1/2018 |

OTHER PUBLICATIONS

English translation of Russia Office Action for RU Application 2019128925 dated Jul. 21, 2020.
European Examination Report for Application No. 17897902.7 dated Nov. 11, 2020.
First India Examination Report and Translation for Application No. 201917034003 dated Jan. 8, 2021.
3GPP TSG RAN1-NR#1; Spokane, USA, Jan. 16-20, 2017; Agenda Item: 5.1.3.3; R1-1701330.
Third Office Action and English Translation of CN Application 201780087414.4 dated Sep. 24, 2020.
Invitation to Respond to Written Opinion for SG Application 11201907750S dated Oct. 2, 2020.
Chili First Office Action and English Translation of CL Application 2019-002358 dated Sep. 16, 2020.
Canada First Office Action for CA Application 3,054,320 dated Sep. 30, 2020.
English Translation of Chinese Office Action for Chinese Application No. 201780087414.4 dated Mar. 17, 2020.
Eurpoean Search Report for European Application No. 17897902.7 dated Jan. 24, 2020.
Chile Office Action with English Translation for CL Application 2019-002358 dated Jun. 17, 2021. (54 pages).
Taiwan Office Action with English Translation for TW Application 107105090 dated Mar. 31, 2021. (12 pages).
Japanese Office Action with English Translation for JP Application 2019-546233 dated Mar. 26, 2021. (6 pages).
Communication pursuant to Article 94(3) EPC for EP Application 17897902.7 mailed May 31, 2021. (6 pages).
Canadian Examination Report for CA Application 3054320 dated Aug. 4, 2021. (3 pages).
Australian Examination Report for AU Application 2017400852 dated Nov. 23, 2021. (4 pages).
Indonesia Office Action with English Translation for ID Application P00201908301 dated Nov. 30, 2021. (10 pages).
Israel Office Action with English Translation for IL Application 268858 dated Dec. 21, 2021. (4 pages).
Japanese Decision to Grant a Patent with English Translation for JP Application 2019546233 dated Dec. 3, 2021. (5 pages).
Chile Office Action with English Translation for CL Application 2019002358 dated Feb. 16, 2022. (4 pages).
Australian Notice of Acceptance for AU Application 2017400852 dated Mar. 11, 2022. (3 pages).
Singapore Notice of Eligibility for Grant for SG Application 11201907750S dated Feb. 28, 2022. (5 pages).

* cited by examiner

300

A network device sends indication information to a terminal device, the indication information is used for the terminal device to determine a target feedback mode for transmitting feedback information, and the feedback information is feedback information of the terminal device for receiving a transport block (TB) sent by the network device — S310

The network device receives the feedback information transmitted by the terminal device using the target feedback mode — S320

FIG. 3

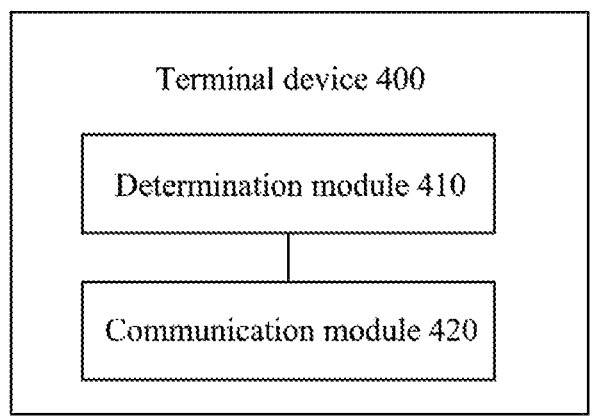

FIG. 4

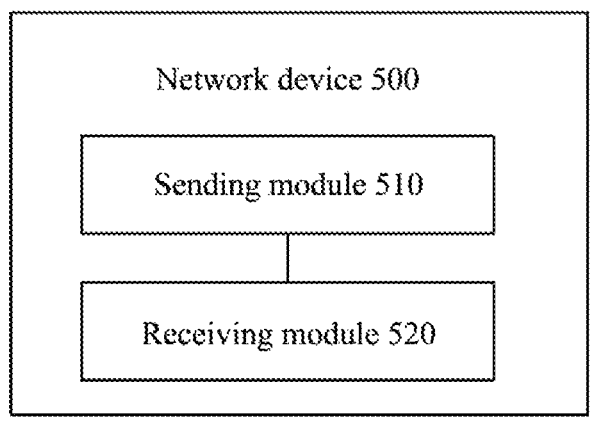

FIG. 5

METHOD FOR TRANSMITTING FEEDBACK INFORMATION, TERMINAL DEVICE AND NETWORK DEVICE

CROSS-REFERENCE TO RELATED APPLICATION(S)

This application is a 371 application of International Application No PCT/CN2017/074832, filed on Feb. 24, 2017, the entire disclosure of which is hereby incorporated by reference.

TECHNICAL FIELD

Implementations of the present application relate to the field of communications, and more particularly relate to a method for transmitting feedback information, a terminal device, and a network device.

BACKGROUND

Adopting a Code Block (CB)-based retransmission method in a 5th-generation (5G) system is discussed, i.e., if part of CBs in a transport block (TB) are failed to be received, a sending end may only retransmit the CBs or a Code Block Group (CBG) that is failed to be received. For such a retransmission method, a terminal needs to feed back acknowledgement/negative acknowledgement (ACK/NACK) of multiple bits which correspond to multiple CBs in a TB. In this feedback method, a utilization rate of transmission resources is improved by increasing feedback overhead. Therefore, a method is needed, by which a mode for transmitting feedback information can be dynamically adjusted, so that both feedback overhead and a utilization rate of transmission resources are taken into account.

SUMMARY

Implementations of the present application provide a method for transmitting feedback information, a terminal device, and a network device.

In a first aspect, a method for transmitting feedback information is provided. The method includes: a terminal device determines a target feedback mode used for transmitting feedback information, wherein the feedback information is feedback information for a transport block (TB) sent by a network device and received by the terminal device. The terminal device uses the feedback information to transmit the target feedback mode.

Optionally, the terminal device may determine the feedback mode used for transmitting the feedback information according to a reception situation of the TB, that is, the terminal device may independently determine which feedback mode to select, or the terminal device may determine the target feedback mode used for transmitting feedback information according to indication information of the network device, that is, the network device configures the terminal device with which feedback mode to use for feedback.

In combination with the first aspect, in some implementations of the first aspect, determining, by the terminal device, the target feedback mode used for transmitting the feedback information, includes: the terminal device determines the target feedback mode according to a reception situation of the TB.

In combination with the first aspect, in some implementations of the first aspect, determining, by the terminal device, the target feedback mode according to the reception situation of the TB, includes: the terminal device determines the target feedback mode from multiple preconfigured feedback modes according to the reception situation of the TB.

Optionally, the terminal device may independently configure multiple feedback modes. Optionally, the multiple feedback modes may be configured by the network device, or the multiple feedback modes may be agreed on in a protocol. The implementations of the present application do not limit a configuration way of the multiple feedback modes.

In combination with the first aspect, in some implementations of the first aspect, the method further includes: the terminal device receives a high-layer signaling sent by the network device, wherein the high-layer signaling includes the multiple feedback modes preconfigured by the network device.

In other words, the network device may configure multiple feedback modes for the terminal device through a high-layer signaling. Optionally, the high-layer signaling may be a Radio Resource Control (RRC) signaling. The implementations of the present application do not specifically limit a transmission way of the multiple feedback modes. For example, the multiple feedback modes may be transmitted through a physical-layer signaling or a Medium Access Control (MAC) layer or transmitted through other specific signalings.

In combination with the first aspect, in some implementations of the first aspect, determining, by the terminal device, the target feedback mode according to the reception situation of the TB, includes: the terminal device determines the target feedback mode according to a first parameter, wherein the first parameter indicates a number of code blocks (CBs) successfully received or failed to be received in the TB, or a proportion of CBs successfully received or failed to be received to a total number of CBs.

Optionally, in some implementations, when a proportion of CBs successfully received in the TB to the total number of CBs included in the TB is greater than a first proportion threshold, or a number of CBs successfully received is greater than a first number threshold, the terminal device may determine to use a bitmap for feedback. In this case, most of the CBs are successfully received, and the bitmap is determined to be used for feedback, so that the network device can be notified that which CBs are failed to be received, and the network device only need to retransmit the CBs that are failed to be received, thereby improving the utilization rate of the transmission resources.

Optionally, the terminal device may determine to use feedback information of 1 bit for feedback when a proportion of CBs that are failed to be received in the TB is greater than a second proportion threshold, or a number of CBs that are failed to be received in the TB is greater than a second number threshold. In this case, most data are failed to be received, and even if the bitmap is used for feedback, the network device still needs to retransmit most of CBs, thus feedback overhead is damaged but the utilization rate of the transmission resources is not greatly improved in exchange. In this case, if the feedback information of 1-bit is used for feedback, the feedback overhead is reduced.

In combination with the first aspect, in some implementations of the first aspect, determining, by the terminal device, the target feedback mode according to the first parameter, includes: the terminal device determines a first range corresponding to the first parameter from multiple ranges, wherein the multiple ranges are ranges of a number of CBs successfully received or failed to be received in one TB, or ranges of a proportion of CBs successfully received or failed to be received to a total number of CBs in one TB. The terminal device determines the target feedback mode according to the first range and a preconfigured correspondence relationship between the multiple ranges and multiple feedback modes.

Optionally, the terminal device may preconfigure a correspondence relationship of multiple ranges and multiple feedback modes. The correspondence relationship may be determined independently by the terminal device, or may be configured by the network device for the terminal device, or may be agreed on in a protocol. The implementations of the present application do not limit a configuration way of the correspondence relationship.

In combination with the first aspect, in some implementations of the first aspect, the method further includes: the terminal device receives a high-layer signaling sent by the network device, wherein the high-layer signaling includes a correspondence relationship preconfigured by the network device.

In other words, the network device may configure the correspondence relationship for the terminal device through a high-layer signaling. Optionally, the high-layer signaling may be an RRC signaling. The implementations of the present application do not specifically limit a transmission way of the correspondence relationship, for example, the correspondence relationship may be transmitted through a physical layer signaling or a MAC layer or transmitted through other specific signalings.

In combination with the first aspect, in some implementations of the first aspect, the method further includes: the terminal device receives information of a resource of a physical uplink control channel (PUCCH) for transmitting the feedback information, sent by the network device, wherein the resource of the PUCCH is capable of transmitting the feedback information transmitted by the terminal device using any one of the multiple feedback modes. Using, by the terminal device, the target feedback mode to transmit the feedback information, includes: the terminal device uses the target feedback mode to transmit the feedback information on the resource of the PUCCH.

In combination with the first aspect, in some implementations of the first aspect, the determining, by the terminal device, the target feedback mode used for transmitting feedback information, includes: the terminal device receives indication information sent by the network device; and the terminal device determines the target feedback mode according to the indication information.

In combination with the first aspect, in some implementations of the first aspect, the indication information indicates information of a format and/or a resource of a physical uplink control channel (PUCCH) used for transmitting the feedback information, and determining, by the terminal device, the target feedback mode according to the indication information, includes: the terminal device determines the target feedback mode according to the information of the format and/or the resource of the PUCCH. Using, by the terminal device, the target feedback mode to transmit the feedback information, includes: using the format and/or the resource of the PUCCH to transmit the feedback information.

In combination with the first aspect, in some implementations of the first aspect, determining, by the terminal device, the target feedback mode according to the information of the format and/or the resource of the PUCCH, includes: the terminal device determines that the target feedback mode is to adopt an acknowledgement/negative acknowledgement (ACK/NACK) of 1 bit for the TB if the information of the format and/or the resource of the PUCCH indicates a format and/or a resource for transmitting one ACK/NACK; or the terminal device determines that the target feedback mode is to adopt an ACK/NACK of multiple bits for the TB if the information of the format and/or the resource of the PUCCH indicates formats and/or resources for transmitting multiple ACKs/NACKs.

In combination with the first aspect, in some implementations of the first aspect, the indication information indicates a feedback mode for the terminal device to transmit the feedback information, and the determining, by the terminal device, the target feedback mode according to the indication information, includes: the terminal device determines a feedback mode indicated by the indication information for transmitting the feedback information, as the target feedback mode.

In combination with the first aspect, in some implementations of the first aspect, the method further includes: the terminal device receives a first signaling sent by the network device, wherein the first signaling includes the indication information, and the first signaling is a physical layer signaling, a Medium Access Control (MAC) layer signaling, or a high-layer signaling.

In combination with the first aspect, in some implementations of the first aspect, the using, by the terminal device, the target feedback mode to transmit the feedback information using, includes: the terminal device uses the target feedback mode to transmit the feedback information on a data channel and/or a control channel.

In combination with the first aspect, in some implementations of the first aspect, the target feedback mode includes a first feedback mode and a second feedback mode, and using, by the terminal device the target feedback mode to transmit the feedback information on the data channel and/or the control channel, includes: using the first feedback mode to transmit the feedback information on the data channel, and using the second feedback mode to transmit the feedback information on the control channel.

In combination with the first aspect, in some implementations of the first aspect, using the first feedback mode to transmit the feedback information on the data channel, includes: the terminal uses the first feedback mode for feedback in a medium access control (MAC) control element (CE).

In combination with the first aspect, in some implementations of the first aspect, the method further includes: the terminal device receives information of a resource for transmitting an uplink data channel sent by the network device. And using, by the terminal device, the target feedback mode to transmit the feedback information on the data channel and/or the control channel, includes: the terminal device uses the target feedback mode to transmit the feedback information on the resource for transmitting the uplink data channel.

In combination with the first aspect, in some implementations of the first aspect, the target feedback mode includes one of: feedback via an ACK/NACK of 1 bit for the TB, feedback via an ACK/NACK of 1 bit for multiple TBs, and feedback via a bitmap for part of or all CBs of the TB, wherein the multiple TBs include the TB.

In a second aspect, a method for transmitting feedback information is provided. The method includes: a network device sends indication information to a terminal device, wherein the indication information is used for the terminal device to determine a target feedback mode for transmitting feedback information, and the feedback information is feedback information of the terminal device for receiving a transport block (TB) sent by the network device; and the network device receives the feedback information transmitted by the terminal device using the target feedback mode.

In combination with the second aspect, in some implementations of the second aspect, the indication information indicates at least one of: multiple feedback modes, a correspondence relationship between multiple ranges and multiple feedback modes, information of a format and/or a resource of a physical uplink control channel (PUCCH) used for transmitting the feedback information, and a feedback mode for transmitting the feedback information by the terminal device, wherein the multiple ranges are ranges of a number of code blocks (CBs) successfully received or failed to be received in one TB, or ranges of a proportion of CBs successfully received or failed to be received to a total number of CBs in one TB.

In combination with the second aspect, in some implementations of the second aspect, the indication information indicates the multiple feedback modes, and receiving, by the network device, the feedback information transmitted by the terminal device using the target feedback mode, includes: the network device receives the feedback information transmitted by the terminal device using a first feedback mode, wherein the first feedback mode is determined by the terminal device from the multiple feedback modes according to a reception situation of the TB.

In combination with the second aspect, in some implementations of the second aspect, the indication information indicates the correspondence relationship between the multiple ranges; wherein the multiple feedback modes, and receiving, by the network device, the feedback information transmitted by the terminal device using the target feedback mode, includes: the network device receives the feedback information transmitted by the terminal device using a second feedback mode, wherein the second feedback mode is determined by the terminal device according to a first range and the correspondence relationship, the first range is a range corresponding to a first parameter, and the first parameter indicates a number of code blocks (CBs) successfully received or failed to be received in the TB, or a proportion of CBs successfully received or failed to be received in a total number of CBs.

In combination with the second aspect, in some implementations of the second aspect, the indication information indicates the feedback mode for transmitting the feedback information by the terminal device, and the receiving, by the network device, the feedback information transmitted by the terminal device using the target feedback mode, includes: the network device receives the feedback information transmitted by the terminal device using the feedback mode for transmitting the feedback information indicated by the indication information.

In combination with the second aspect, in some implementations of the second aspect, the indication information indicates the information of the format and/or the resource of the PUCCH used for transmitting the feedback information, and receiving, by the network device, the feedback information transmitted by the terminal device using the target feedback mode, includes: the network device receives the feedback information transmitted by the terminal device using a third feedback mode, wherein the third feedback mode is determined according to the information of the format and/or the resource of the PUCCH.

In combination with the second aspect, in some implementations of the second aspect, receiving, by the network device, the feedback information transmitted by the terminal device using the third feedback mode, includes: the network device receives feedback information fed back by the terminal device using an acknowledgement/negative acknowledgement (ACK/NACK) of 1 bit if the information of the format and/or the resource of the PUCCH indicates a format and/or a resource for transmitting one ACK/NACK; or the network device receives the feedback information fed back by the terminal device using an ACK/NACK of multiple bits if the information of the format and/or the resource of the PUCCH indicates formats and/or resources for transmitting multiple ACKs/NACKs.

In combination with the second aspect, in some implementations of the second aspect, sending, by the network device, the indication information to the terminal device, includes: the network device sends a high-layer signaling to the terminal device, wherein the high-layer signaling includes the indication information.

In combination with the second aspect, in some implementations of the second aspect, the high-layer signaling is a radio resource control (RRC) signaling.

In combination with the second aspect, in some implementations of the second aspect, the method further includes: the network device sends information of a resource of a physical uplink control channel (PUCCH) for transmitting the feedback information to the network device, wherein the resource of the PUCCH is capable of transmitting the feedback information transmitted by the terminal device using any one of the multiple feedback modes; and receiving, by the network device, the feedback information transmitted by the terminal device using the target feedback mode, includes: the network device receives the feedback information transmitted by the terminal device using the target feedback mode on the resource of the PUCCH.

In combination with the second aspect, in some implementations of the second aspect, receiving, by the network device, the feedback information transmitted by the terminal device using the target feedback mode, includes: the network device receives the feedback information transmitted by the terminal device using the target feedback mode on a data channel and/or a control channel.

In combination with the second aspect, in some implementations of the second aspect, the target feedback mode includes a first target feedback mode and a second target feedback mode, and the receiving, by the network device, the feedback information transmitted by the terminal device using the target feedback mode on the data channel and/or the control channel, includes: the network device receives the feedback information transmitted by the terminal device using the first target feedback mode on the data channel, and the feedback information transmitted by the terminal device using the second target feedback mode on the control channel.

In combination with the second aspect, in some implementations of the second aspect, receiving, by the network device, the feedback information transmitted by the terminal device using the first target feedback mode on the data channel, includes: the network device receives the feedback information fed back by the terminal device using the first target feedback mode in a medium access control (MAC) control element (CE).

In combination with the second aspect, in some implementations of the second aspect, the method further includes: the network device sends information of a resource for transmitting an uplink data channel to the terminal device; receiving, by the network device, the feedback information transmitted by the terminal device using the target feedback mode on the data channel and/or the control channel, includes: the network device receives the feedback information transmitted by the terminal device using the target feedback mode on the resource for transmitting the uplink data channel.

In combination with the second aspect, in some implementations of the second aspect, the target feedback mode includes one of: feedback via an ACK/NACK of 1 bit for the TB, feedback via an ACK/NACK of 1 bit for multiple TBs, and feedback via a bitmap for part of or all CBs of the TB, wherein the multiple TBs include the TB.

In a third aspect, a terminal device is provided. The terminal device includes units for performing the method in the first aspect or various implementations thereof.

In a fourth aspect, a network device is provided. The network device includes units for performing the method in the second aspect or various implementations thereof.

In a fifth aspect, a terminal device is provided. The terminal device a storage, processor, and transceiver, wherein the storage is used for storing a program, the processor is used for executing the program, and when the program is executed, the processor performs the method of the first aspect based on the transceiver.

In a sixth aspect, a network device is provided. The network device includes a storage, a processor, and a transceiver, wherein the storage is used for storing a program, the processor is used for executing the program, and when the program is executed, the processor perform the method of the second aspect based on the transceiver.

In a seventh aspect, a computer readable medium is provided. The computer readable medium stores program codes for execution by a terminal device, wherein, the program codes include instructions for executing the method in the first aspect.

In an eighth aspect, a computer readable medium is provided. The computer readable medium stores program codes for execution by a terminal device, wherein the program codes include instructions for executing the method of the second aspect.

BRIEF DESCRIPTION OF DRAWINGS

FIG. 3 is a schematic flow chart of a method for transmitting feedback information according to another implementation of the present application.

FIG. 4 is a schematic block diagram of a terminal device according to an implementation of the present application.

FIG. 5 is a schematic block diagram of a network device according to an implementation of the present application.

DETAILED DESCRIPTION

Technical solutions in implementations of the present application will be described in the following with reference to drawings in implementations of the present application.

The technical solutions of the implementations of the present application may be applied to various communication systems, such as, a Global System of Mobile communication (GSM), a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS) system, a Worldwide Interoperability for Microwave Access (WiMAX) communication system, or a future 5G system.

Figure 1:
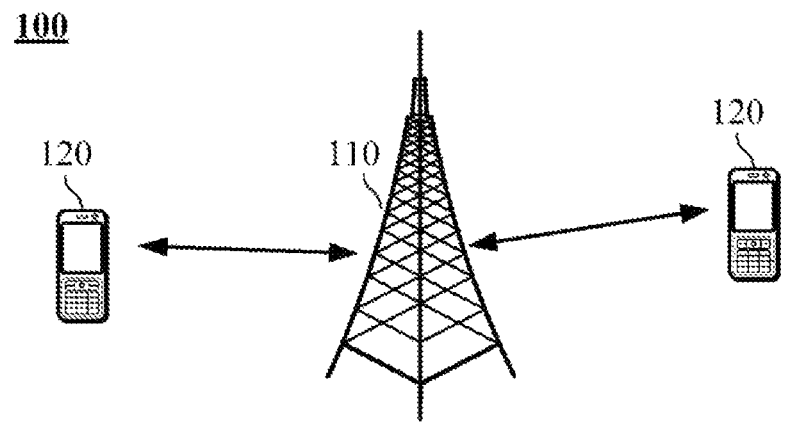
FIG. 1 is a schematic diagram of a wireless communication system according to an implementation of the present application.

FIG. 1 shows a wireless communication system 100 to which an implementation of the present application is applied. The wireless communication system 100 may include a network device 110. The network device 100 may be a device that communicates with a terminal device. The network device 100 may provide communication coverage for a specific geographical area, and may communicate with a terminal device (e.g., UE) in the coverage area. Optionally, the network device 100 may be a Base Transceiver Station (BTS) in a GSM system or CDMA system, a NodeB (NB) in a WCDMA system, an Evolutional Node B (eNB or eNodeB) in an LTE system, or a wireless controller in a Cloud Radio Access Network (CRAN). Or, the network device may be a relay station, an access point, a vehicle-mounted device, or a wearable device, a network side device in a future 5G network, or a network device in a future evolved Public Land Mobile Network (PLMN), etc.

The wireless communication system 100 also includes at least one terminal device 120 in the coverage area of the network device 110. The terminal device 120 may be mobile or fixed. Optionally, the terminal device 120 may be referred to as an access terminal, a User equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing device connected to a wireless modem, a vehicle-mounted device, a wearable device, a terminal device in a future 5G network, or a terminal device in a future evolving Public Land Mobile Network (PLMN), or the like.

Optionally, the 5G system or network may also be referred to as a New Radio (NR) system or network.

FIG. 1 exemplifies one network device and two terminal devices. Optionally, the wireless communication system 100 may include multiple network devices, and another number of terminal devices may be included within the coverage area of each network device, which is not limited in the implementations of the present application.

Optionally, the wireless communication system 100 may also include other network entities such as a network controller, a mobile management entity, and implementations of the present application are not limited thereto.

It should be understood that the terms "system" and "network" are often used interchangeably in this document. The term "and/or" in this document is merely an association relationship describing associated objects, indicating that there may be three relationships, for example, a and/or b may indicate three cases: a alone, a and b, and b alone. In addition, the symbol "/" in this document generally indicates that objects before and after the symbol "/" have an "or" relationship.

Figure 2:
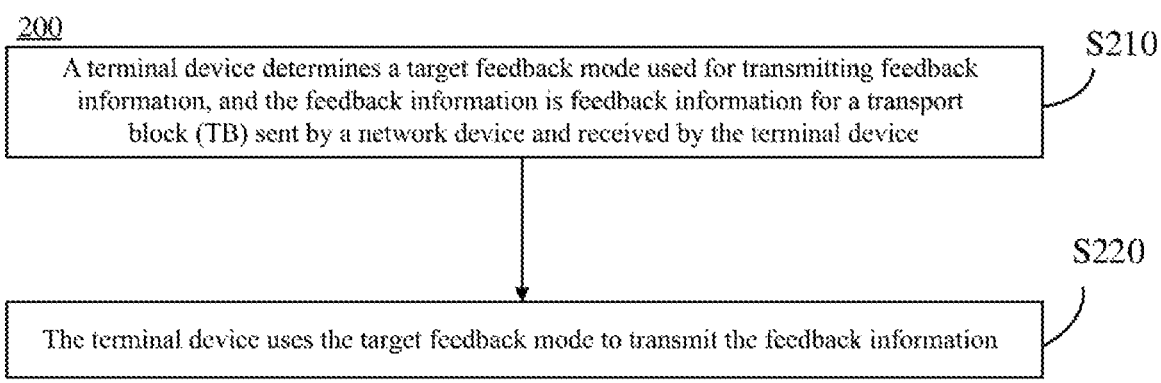
FIG. 2 is a schematic flow chart of a method for transmitting feedback information according to an implementation of the present application.

FIG. 2 is a schematic flow chart of a method 200 for transmitting feedback information according to an implementation of the present application. As shown in FIG. 2, the method 200 includes acts S210-S220.

In S210, a terminal device determines a target feedback mode used for transmitting feedback information, wherein the feedback information is feedback information for a transport block (TB) sent by a network device and received by the terminal device.

In S220, the terminal device uses the target feedback mode to transmit the feedback information.

Specifically, the terminal device may receive the TB sent by the network device, and when determining the feedback information for the TB, the terminal device may dynamically adjust a feedback mode used for transmitting the feedback information. Optionally, the terminal device may determine a feedback mode used for transmitting feedback information according to a reception situation of the TB. For example, when a proportion of CBs successfully received in the TB to the total number of CBs included in the TB is greater than a first proportion threshold, or a number of CBs successfully received is greater than a first number threshold, the terminal device may determine to use a bitmap for feedback, i.e. to feed back the feedback information of all CBs of the TB. Therefore, the network device may determine which CBs are failed to be received according to the feedback information, and only retransmit the CBs which are failed to be received, thereby improving the utilization rate of the transmission resources. In this case, a number of CBs successfully received is relatively large. If feedback information of 1 bit is used, the network device does not know which CBs have been successfully received and which CBs have been failed to be received, so that all CBs need to be retransmitted during retransmission, the utilization rate of the transmission resources are reduced. Optionally, when a proportion of CBs that are failed to be received in the TB is greater than a second proportion threshold, or a number of CB that are failed to be received in the TB is greater than a second number threshold, the terminal device may determine to use feedback information of 1 bit for feedback, i.e. to feed back the feedback information of 1 bit for the TB. The network device may retransmit all TBs after receiving the feedback information of 1 bit. In this case, since most of data in the TB is failed to be received, that is to say, most of the data needs to be retransmitted. Even if the bitmap is used for feedback, the network device needs to retransmit most of the data, which causes that the feedback overhead is increased, and an effect of improving the utilization rate of the transmission resources is not good. Therefore, in the method for transmitting feedback information of the implementation of the present application, a feedback mode used for transmitting feedback information can be dynamically adjusted, thereby taking both the feedback overhead and the utilization rate of the transmission resource into account.

Optionally, in some implementations, the terminal device may determine the target feedback mode used for transmitting feedback information according to indication information of the network device. The indication information may directly indicate to the terminal device which feedback mode is to be used for feedback, or the network device may preconfigure multiple feedback modes for the terminal device, and the terminal device may determine a feedback mode used for transmitting feedback information from the preconfigured multiple feedback modes. For example, the network device may configure the following feedback modes: feedback via an ACK/NACK of 1 bit, feedback via an ACK/NACK of multiple bits, for example, feedback via a bitmap for part of or all CBs of the TB. The terminal device may determine which feedback mode to be used from the multiple feedback modes according to a reception situation of TB. For example, the terminal device may determine to use feedback information of multiple bits for feedback when a proportion of successful reception of the TB is greater than a certain proportion, for example, 90%, or the terminal device may determine to use feedback information of 1 bit for feedback when a number of CBs that are failed to be received is greater than a number threshold, for example, 5.

That is to say, the terminal device may independently determine to select which feedback mode or the network device may configure the terminal device with which feedback mode to be used for feedback.

By way of example but not limitation, the target feedback mode includes at least one of: feedback via an ACK/NACK of 1 bit for the TB, feedback via an ACK/NACK of multiple bits for multiple TBs, and feedback via a bitmap for part of or all CBs of the TB.

Herein, feedback via an ACK/NACK of 1 bit for the TB, is simply called "Mode 1", feedback via an ACK/NACK of 1 bit for multiple TBs, is simply called "Mode 2", feedback via a bitmap for part of CBs of the TB, is simply called "Mode 3", and feedback via a bitmap for all CBs of the TB, is simply called "Mode 4".

Optionally, in some implementations, the determining, by the terminal device, the target feedback mode used for transmitting feedback information, includes: the terminal device determines the target feedback mode according to a reception situation of the TB.

Specifically, the terminal device may determine the target feedback mode used for transmitting feedback information according to the reception situation of the TB. For example, the terminal device may determine to use a bitmap for feedback when a proportion of CBs successfully received in the TB is greater than a first proportion threshold; or, when a proportion of CBs failed to be received in the TB is greater than a second proportion threshold, NACK of 1 bit is determined to be used for feedback. That is to say, the terminal device may independently determine how many bits of feedback information to be used for feedback based on the reception situation of the TB.

Optionally, in some implementations, determining, by the terminal device, the target feedback mode according to a reception situation of the TB, includes: the terminal device determines the target feedback mode from multiple preconfigured feedback modes according to the reception situation of the TB.

Specifically, the terminal device may independently configure multiple feedback modes. Optionally, the multiple feedback modes may be configured by the network device, or the multiple feedback modes may be agreed on in a protocol. The implementations of the present application do not limit a configuration way of the multiple feedback modes. The terminal device may determine the target feedback mode from multiple preconfigured feedback modes according to the reception situation of the TB. By way of example and not limitation, the multiple feedback modes include modes 1 to 4, and the terminal device may determine a target feedback mode from the modes 1 to 4 according to the reception situation of the TB. For example, when a proportion of CBs successfully received to a total number of CBs is greater than a first proportion threshold, for example, 90%, the terminal device may determine to use mode 4 to transmit feedback information, i.e., to use a bitmap for feedback. Or, when a proportion of CBs failed to be received to the total number of CBs is greater than a second proportion threshold, for example, 20%, the terminal device may determine to use mode 1 for feedback, i.e. to use NACK of 1 bit for feedback. In this case, most data are failed to be received, and even if a bitmap is used for feedback, the network device still needs to retransmit most of the CBs, so the utilization rate of the transmission resources is not greatly improved by increasing feedback overhead. In this case, if feedback information of 1 bit is used for feedback, the feedback overhead is reduced.

Optionally, in some implementations, the method 200 further includes: the terminal device receives a high-layer signaling sent by the network device, wherein the high-layer signaling includes the multiple feedback modes preconfigured by the network device.

In other words, the network device may configure the multiple feedback modes for the terminal device through the high-layer signaling. Optionally, the high-layer signaling may be a Radio Resource Control (RRC) signaling. The implementations of the present application do not specifically limit a transmission way of the multiple feedback modes. For example, the multiple feedback modes may be transmitted through a physical layer signaling or a MAC layer or transmitted through other specific signalings.

Optionally, in some implementations, the determining, by the terminal device, the target feedback mode according the reception situation of the TB, includes: the terminal device determines the target feedback mode according to a first parameter, wherein the first parameter indicates a number of code blocks (CBs) successfully received or failed to be received in the TB, or a proportion of CBs successfully received or failed to be received to a total quantity of CBs.

Specifically, the terminal device may determine a target feedback mode according to a number of CBs successfully received or failed to be received in the TB or a proportion of CBs successfully received or failed to be received to a total number of CBs. For example, when a number of CBs successfully received in the TB is greater than a first number threshold, or when a proportion of CBs successfully received in the TB to a total number of CBs is greater than a first proportion threshold, the terminal device may determine to use a bitmap for feedback, that is, most of the CBs are successfully received, and the bitmap is determined to be used for feedback, so that the network device can be notified of which CBs are failed to be received, and the network device only need to retransmit the CBs that are failed to be received, thereby improving the utilization rate of the transmission resources. Or when a number of CBs failed to be received in the TB is greater than a second number threshold, feedback information of 1 bit is determined to be used for feedback, or when a proportion of CBs failed to be received in the TB is greater than a second proportion threshold, feedback information of 1 bit is determined to be used for feedback, i.e. most of CBs are failed to be received, NACK of 1 bit is determined to be used for feedback. In this case, even if the bitmap is used for feedback, the network device still needs to retransmit most of CBs, so that the utilization rate of the transmission resource is not greatly improved by increasing feedback overhead. In this case, if feedback information of 1 bit is used for feedback, the feedback overhead is reduced. Therefore, in the method for transmitting feedback information of the implementation of the present application, the feedback overhead and the utilization rate of the transmission resource are both taken into account.

Optionally, in some implementations, the determining, by the terminal device, the target feedback mode according to the first parameter, includes: the terminal device determines a first range corresponding to the first parameter from multiple ranges, wherein the multiple ranges are ranges of a number of CBs successfully received or failed to be received in one TB, or ranges of a proportion of CBs successfully received or failed to be received to a total number of CBs in one TB; and the terminal device determines the target feedback mode according to the first range and a preconfigured correspondence relationship between the multiple ranges and the multiple feedback modes.

Specifically, the terminal device may preconfigure the correspondence relationship of the multiple ranges and the multiple feedback modes. The correspondence relationship may be determined independently by the terminal device, or may be configured by the network device for the terminal device, or may be agreed on in a protocol. The implementations of the present application do not limit a configuration way of the correspondence relationship.

Optionally, the multiple ranges may be ranges of a number of CBs successfully received or failed to be received in one TB, or may be ranges of a proportion of CBs successfully received or failed to be received to a total number of CBs in one TB. For example, the multiple ranges are ranges of the proportion of CBs successfully received to the total number of CBs, and the multiple ranges may include: range 1: 0-90%, range 2: 90-100%, and the multiple feedback modes may include: mode 1 and mode 4, wherein the range 1 corresponds to the mode 1, and the range 2 corresponds to the mode 4. Or, the multiple ranges are ranges of the number of CBs failed to be received, and the multiple ranges may include: range 1: 0 to 5, and range 2: 5 or more than 5, and the range 1 and the range 2 respectively correspond to the mode 4 and the mode 1. The terminal device may determine a first parameter according to the reception situation of the TB, i.e., a number of CBs that received successfully or failed to be received in the TB, or a proportion of CBs that received successfully or failed to be received to a total number of CBs in the TB, and then the terminal device may determine which range the first parameter falls in from the multiple ranges, so that a feedback mode corresponding to the range in which the first parameter falls may be determined according to the correspondence relationship.

Optionally, in some implementations, the method 200 further includes: the terminal device receives a high-layer signaling sent by the network device, wherein the high-layer signaling includes the correspondence relationship preconfigured by the network device.

In other words, the network device may configure the correspondence relationship to the terminal device through a high-layer signaling, and optionally, the high-layer signaling may be a RRC signaling. The implementations of the present application do not specifically limit a transmission way of the correspondence relationship, for example, the correspondence relationship may be transmitted through a physical layer signaling or a MAC layer or transmitted through other specific signalings.

Optionally, in some implementations, the method 200 further includes: the terminal device receives information of a resource of a physical uplink control channel (PUCCH) sent by the network device for transmitting the feedback information, wherein the resource of the PUCCH is capable of transmitting the feedback information transmitted by the terminal device using any one of the multiple feedback modes; and the using, by the terminal device the target feedback mode to transmit the feedback information, includes: the terminal device uses the target feedback mode to transmit the feedback information on the resource of the PUCCH.

Specifically, if the target feedback mode is determined by the terminal device and the network device does not know which feedback mode the terminal device uses for feedback, in this case, the network device transmits information of a resource of a Physical Uplink Control Channel (PUCCH) for transmitting feedback information to the terminal device. A size of the resource of the PUCCH needs to be equal to or greater than a size of a resource occupied by feedback information that is largest in size among resources occupied by feedback information of the multiple feedback modes, so that the terminal device has sufficient transmission resource regardless of which feedback mode is adopted for feedback. For example, the feedback modes include modes 1 to 4. The size of the resource of the PUCCH may be a size of a resource occupied by the feedback information when the mode 4 is used for feedback, that is, a size of a resource occupied by the feedback information when a bitmap is used for feedback, so that the resource of the PUCCH is large enough regardless of which feedback mode the terminal device uses for feedback.

Optionally, in some implementations, determining, by the terminal device, the target feedback mode used for transmitting feedback information, includes: the terminal device receives first indication information sent by the network device; and the terminal device determines the target feedback mode according to the indication information.

That is, the terminal device may determine the target feedback mode according to the indication information of the network device.

Optionally, in some implementations, the indication information indicates information of a format and/or a resource of a physical uplink control channel (PUCCH) used for transmitting the feedback information. In this case, determining, by the terminal device, the target feedback mode according to the indication information, includes: the terminal device determines the target feedback mode according to the information of the format and/or the resource of the PUCCH; and using, by the terminal device, the target feedback mode to transmit the feedback information, includes: using the format and/or the resource of the PUCCH to transmit the feedback information.

Optionally, in some implementations, determining, by the terminal device, the target feedback mode according to the information of the format and/or the resource of the PUCCH, includes: the terminal device determines that the target feedback mode is to adopt an acknowledgement/negative acknowledgement (ACK/NACK) of 1 bit for the TB if the information of the format and/or the resource of the PUCCH indicates a format and/or a resource for transmitting one ACK/NACK; or the terminal device determines that the target feedback mode is to adopt an ACK/NACK of multiple bits for the TB if the information of the format and/or the resource of the PUCCH indicates formats and/or resources for transmitting multiple ACKs/NACKs.

Specifically, the indication information may indicate information of the format and/or resource for PUCCH, for example, if the network device configures a format and/or resource for transmitting an ACK/NACK (e.g., a short PUCCH of an orthogonal frequency division multiplexing (OFDM) symbol), the terminal device may determine the target feedback mode in which an ACK/NACK of 1 bit is used for feedback, or if the network device configures formats and/or resources for transmitting multiple ACKs/NACKs, the terminal device may use an ACK/NACK of multiple bits for feedback, that is, the terminal device may determine a mode used for transmitting feedback information according to the resources configured by the network device.

Optionally, in some implementations, the indication information indicates a feedback mode for the terminal device to transmit the feedback information, and the determining, by the terminal device, the target feedback mode according to the indication information, includes: the terminal device determines a feedback mode for transmitting the feedback information indicated by the indication information, as the target feedback mode.

In other words, the indication information may directly indicate to the terminal device the feedback mode for transmitting feedback information, that is, the network device may directly configure which feedback mode the terminal device uses for feedback, so that the terminal device may determine the feedback mode indicated by the indication information as the target feedback mode. Optionally, in some implementations, if the terminal device receives first indication information and second indication information sent by the network device, the first indication information indicates that the terminal device uses a first feedback mode for feedback, the second indication information indicates information of a resource of a PUCCH or other information requiring the terminal device to further determine a feedback mode, the terminal device determines to uses the first feedback mode to transmit the feedback information, that is, a priority of an explicit indication is greater than a priority of an implicit indication.

Optionally, in some implementations, the method 200 further includes: the terminal device receives a first signaling sent by the network device, wherein the first signaling includes the indication information, and the first signaling is a physical layer signaling, a MAC layer signaling, or a high-layer signaling. The implementations of the present application do not specifically limit a transmission way of the indication information, for example, the indication information may be transmitted through other specific signalings.

Optionally, in some implementations, optionally, using, by the terminal device, the target feedback mode to transmit the feedback information, includes: the terminal device uses the target feedback mode to transmit the feedback information on a data channel and/or a control channel.

Specifically, if the terminal device determines to use a bitmap for feedback, the terminal device may use the target feedback mode for feedback on a data channel, or may use the target feedback mode for feedback on a control channel, or may use the target feedback mode for feedback on a control channel and a data channel. Since resources of the control channel are less than those of the data channel, optionally, the terminal device may use feedback information of 1 bit for feedback on the control channel and use a bitmap for feedback on the data channel.

Optionally, in some implementations, the target feedback mode includes a first feedback mode and a second feedback mode, and using, by the terminal device, the target feedback mode to transmit the feedback information on the data channel and/or the control channel, includes: using the first feedback mode to transmit the feedback information on the data channel and using the first feedback mode to transmit the feedback information on the control channel.

Specifically, the terminal device may transmit the feedback information on the data channel and the control channel at the same time. Optionally, the terminal device may use the first feedback mode for feedback on the data channel and the second feedback mode for feedback on the control channel. The first feedback mode and the second feedback mode may be the same or different, that is, the terminal device may use two feedback modes for feedback at the same time. Optionally, the first feedback mode and the second feedback mode may include several modes of the modes 1 to 4.

Optionally, in some implementations, using the first feedback mode to transmit the feedback information on the data channel, includes: the terminal device uses the first feedback mode for feedback in a medium access control (MAC) control element (CE).

That is, the terminal device may transmit the feedback information through a MAC CE. The terminal device may include the feedback information, for example, an ACK/NACK of 1 bit, or a bitmap for all CBs, in the MAC CE.

Optionally, in some implementations, the method further includes: the terminal device receives information of a resource for transmitting an uplink data channel sent by the network device; and using, by the terminal device, the target feedback mode to transmit the feedback information on the data channel and/or the control channel, includes: the terminal device uses the target feedback mode to transmit the feedback information on the resource for transmitting the uplink data channel.

Specifically, the network device may configure the resource to be used by the terminal device for transmitting the uplink data channel, and when the terminal device determines to transmit feedback information on the data channel, the terminal device may use the target feedback mode to transmit the feedback information on the resource of the uplink data channel configured by the network device.

Optionally, the target feedback mode includes one of: feedback via an ACK/NACK of 1 bit for the TB, feedback via an ACK/NACK of 1 bit for multiple TBs, and feedback via a bitmap for part of or all CBs of the TB, wherein the multiple TBs include the TB.

The terminal device may perform the same feedback for multiple received TBs. For example, if the multiple TBs are correctly received, the terminal device may perform feedback for the multiple TBs by using feedback information of 1 bit, thus the feedback information may be feedback information for the multiple TBs.

The method for transmitting feedback information according to the implementation of the present application is described in detail from a perspective of the terminal device in the above in combination with FIG. 2, and a method for transmitting feedback information according to another implementation of the present application is described in detail from a perspective of a network device below in combination with FIG. 3. It should be understood that the description of the network device side corresponds to the description of the terminal device side, and similar descriptions can refer to the above description, which will not be repeated here to avoid repetition.

FIG. 3 is a schematic flow chart of a method for transmitting feedback information according to another implementation of the present application. As shown in FIG. 3, the method 300 includes acts S310-S320.

In S310, a network device sends indication information to a terminal device, wherein the indication information is used for the terminal device to determine a target feedback mode for transmitting feedback information, and the feedback information is feedback information of the terminal device for receiving a transport block (TB) sent by the network device.

In S320, the network device receives the feedback information transmitted by the terminal device using the target feedback mode.

Therefore, the network device may send indication information to the terminal device, so that the terminal device may determine a feedback mode used for transmitting feedback information according to the indication information, so that the terminal device may dynamically adjust the feedback mode used for transmitting feedback information.

Optionally, in some implementations, the indication information indicates at least one of: multiple feedback modes, a correspondence relationship between multiple ranges and multiple feedback modes, information of a format and/or a resource of a physical uplink control channel (PUCCH) used for transmitting the feedback information, and a feedback mode for transmitting the feedback information by the terminal device, wherein the multiple ranges are ranges of a number of code blocks (CBs) successfully received or failed to be received in one TB, or ranges of a proportion of CBs successfully received or failed to be received to a total number of CBs in one TB.

Optionally, in some implementations, the indication information indicates the multiple feedback modes, and the receiving, by the network device, the feedback information transmitted by the terminal device using the target feedback mode, includes: the network device receives the feedback information transmitted by the terminal device using a first feedback mode, wherein the first feedback mode is determined by the terminal device from the multiple feedback modes according to a reception situation of the TB.

That is, the network device may configure multiple feedback modes for the terminal device, so that the terminal device may determine a first feedback mode used for transmitting feedback information from the multiple feedback modes according to the reception situation of the TB.

Optionally, in some implementations, the indication information indicates a correspondence relationship between the multiple ranges and the multiple feedback modes, and the receiving, by the network device, the feedback information transmitted by the terminal device using the target feedback mode, includes: the network device receives the feedback information transmitted by the terminal device using a second feedback mode, wherein the second feedback mode is determined by the terminal device according to a first range and the correspondence relationship, the first range is a range corresponding to a first parameter, and the first parameter indicates a number of code blocks (CBs) successfully received or failed to be received in the TB, or a proportion of the CBs successfully received or failed to be received in the total number of CBs.

That is, the network device may configure the terminal device with the correspondence relationship between the multiple ranges and the multiple feedback modes, then the terminal device may determine a first range corresponding to the first parameter in the multiple ranges according to the first parameter, determine a feedback mode corresponding to the first range in the correspondence relationship to determine the feedback mode corresponding to the first range as the target feedback mode used for transmitting the feedback information.

Optionally, in some implementations, the indication information indicates the feedback mode for transmitting the feedback information by the terminal device, and the receiving, by the network device, the feedback information transmitted by the terminal device using the target feedback mode, includes: the network device receives the feedback information transmitted by the terminal device using the feedback mode for transmitting the feedback information indicated by the indication information.

That is, the network device may directly indicate to the terminal device which feedback mode is to be used for feedback through the indication information, so that the terminal device may directly determine the feedback mode indicated by the indication information as the target feedback mode.

Optionally, in some implementations, the indication information indicates information of a format and/or a resource of a PUCCH used for transmitting the feedback information, and receiving, by the network device, the feedback information transmitted by the terminal device using the target feedback mode, includes: the network device receives the feedback information transmitted by the terminal device using a third feedback mode, wherein the third feedback mode is determined according to the information of the format and/or the resource of the PUCCH.

Optionally, in some implementations, receiving, by the network device, the feedback information transmitted by the terminal device using the third feedback mode, includes: the network device receives feedback information fed back by the terminal device using an acknowledgement/negative acknowledgement (ACK/NACK) of 1 bit if the information of the format and/or the resource of the PUCCH indicates a format and/or a resource for transmitting an ACK/NACK; or the network device receives the feedback information fed back by the terminal device using an ACK/NACK of the multiple TBs if the information of the format and/or the resource of the PUCCH indicates formats and/or resources for transmitting multiple ACKs/NACKs.

In other words, the network device may indirectly indicate the feedback mode to be used by the terminal device to transmit feedback information through the information of the format and/or resource of the PUCCH. If the format and/or resource of the PUCCH is a resource for feeding back information of 1 bit, the terminal device uses the feedback information of 1 bit for feedback. If the format and/or resource of PUCCH is a resource for feeding back information of multiple bits, the terminal device uses the feedback information of multiple bits for feedback.

Optionally, in some implementations, sending, by the network device, the indication information to the terminal device, includes: the network device sends a high-layer signaling to the terminal device, wherein the high-layer signaling includes the indication information.

Optionally, in some implementations, the high-layer signaling is a radio resource control (RRC) signaling.

Optionally, in some implementations, the method further includes: the network device sends information of a resource of a physical uplink control channel (PUCCH) for transmitting the feedback information to the network device, wherein the resource of the PUCCH is capable of transmitting the feedback information transmitted by the terminal device using any one of the multiple feedback modes; and the receiving, by the network device, the feedback information transmitted by the terminal device using the target feedback mode, includes: the network device receives the feedback information transmitted by the terminal device using the target feedback mode on the resource of the PUCCH.

Optionally, in some implementations, the receiving, by the network device, the feedback information transmitted by the terminal device using the target feedback mode, includes: the network device receives the feedback information transmitted by the terminal device using the target feedback mode on a data channel and/or a control channel.

Optionally, in some implementations, the target feedback mode includes a first target feedback mode and a second target feedback mode, and receiving, by the network device, the feedback information transmitted by the terminal device using the target feedback mode on the data channel and/or the control channel, includes: the network device receives the feedback information transmitted by the terminal device using the first target feedback mode on the data channel and using the second target feedback mode on the control channel.

Optionally, in some implementations, receiving, by the network device, the feedback information transmitted by the terminal device using the first target feedback mode on the data channel, includes: the network device receives the feedback information transmitted by the terminal device using the first target feedback mode in a medium access control (MAC) control element (CE).

Optionally, in some implementations, the method further includes: the network device sends information of a resource for transmitting an uplink data channel to the terminal device; and receiving, by the network device, the feedback information transmitted by the terminal device using the target feedback mode on the data channel and/or the control channel, includes: the network device receives the feedback information transmitted by the terminal device using the target feedback mode on the resource for transmitting the uplink data channel.

Optionally, in some implementations, the target feedback mode includes one of: feedback via an ACK/NACK of 1 bit for the TB, feedback via an ACK/NACK of multiple bits for multiple TBs, and feedback via a bitmap for part of or all CBs of the TB, wherein the multiple TBs include the TB.

The method implementations of the present application are described in detail above with reference to FIGS. 2 to 3, device implementations of the present application are described in detail below with reference to FIGS. 4 to 7. It should be understood that the device implementations and the method implementations correspond to each other, and description of the method implementations may be referred to for similar description of the device implementations.

FIG. 4 is a schematic block diagram of a terminal device 400 according to an implementation of the present application. As shown in FIG. 4, the terminal device 400 includes a determination module 410 and a communication module 420.

The determination module 410 is used for determining a target feedback mode used for transmitting feedback information, wherein the feedback information is feedback information for a transport block (TB) sent by a network device and received by the terminal device.

The communication module 420 is used for using the feedback information to transmit the feedback information.

Optionally, in some implementations, the determination module 410 is specifically used for: determining the target feedback mode according to a reception situation of the TB.

Optionally, in some implementations, the determination module 410 is specifically used for: determining the target feedback mode from multiple preconfigured feedback modes according to the reception situation of the TB.

Optionally, in some implementations, the communication module 420 is further used for: receiving a high-layer signaling sent by the network device, wherein the high-layer signaling includes the multiple feedback modes preconfigured by the network device.

Optionally, in some implementations, the determination module 410 is specifically used for: determining the target feedback mode according to a first parameter, wherein the first parameter indicates a number of code blocks (CBs) successfully received or failed to be received in the TB, or a proportion of the CBs successfully received or failed to be received to a total number of CBs.

Optionally, in some implementations, the determination module 410 is specifically used for: determining a first range corresponding to the first parameter from multiple ranges, wherein the multiple ranges are ranges of a number of CBs successfully received or failed to be received in one TB, or ranges of a proportion of CBs successfully received or failed to be received to a total number of CBs in one TB; and determining the target feedback mode according to the first range and a preconfigured correspondence relationship between the multiple ranges and multiple feedback modes.

Optionally, in some implementations, the communication module 420 is further used for: receiving a high-layer signaling sent by the network device, wherein the high-layer signaling includes the correspondence relationship preconfigured by the network device.

Optionally, in some implementations, the communication module 420 is further used for: receiving information of a resource of a physical uplink control channel (PUCCH) sent by the network device for transmitting the feedback information, wherein the resource of the PUCCH is capable of transmitting the feedback information transmitted by the terminal device using any one of the multiple feedback modes; and using the target feedback information to transmit the feedback information on the resource of the PUCCH.

Optionally, in some implementations, the communication module 420 is further used for: receiving indication information sent by network device.

The determination module 410 is specifically used for: determining the target feedback mode according to the indication information.

Optionally, in some implementations, the indication information indicates information of a format and/or a resource of a physical uplink control channel (PUCCH) used for transmitting the feedback information, and the determination module 410 is specifically used for: determining the target feedback mode according to the information of the format and/or the resource of the PUCCH.

The communication module 420 is specifically used for: using the format and/or the resource of the PUCCH to transmit the feedback information.

Optionally, in some implementations, the determination module 410 is specifically used for: determining that the target feedback mode is to adopt an acknowledgement/ negative acknowledgement (ACK/NACK) of 1 bit for the TB if the information of the format and/or the resource of the PUCCH indicates a format and/or a resource for transmitting one ACK/NACK; or determining that the target feedback mode is to adopt an ACK/NACK of multiple bits for the TB if the information of the format and/or the resource of the PUCCH indicates formats and/or resources for transmitting multiple ACKs/NACKs.

Optionally, in some implementations, the indication information indicates a feedback mode for the terminal device to transmit the feedback information, and the determination module 410 is specifically used for: determining a feedback mode indicated by the indication information for transmitting the feedback information, as the target feedback mode.

Optionally, in some implementations, the communication module 420 is further used for: receiving a first signaling sent by the network device, wherein the first signaling includes the indication information, and the first signaling is a physical layer signaling, a MAC layer signaling, or a high-layer signaling.

Optionally, in some implementations, the communication module 420 is specifically used for: using the target feedback mode to transmit the feedback information on a data channel and/or a control channel.

Optionally, in some implementations, the target feedback mode includes a first feedback mode and a second feedback mode, and the communication module 420 is specifically used for: using the first feedback mode to transmit the feedback information on the data channel and using the second feedback mode to transmit the feedback information on the control channel.

Optionally, in some implementations, the communication module 420 is specifically used for: using the first feedback mode in a medium access control (MAC) control element (CE) for feedback.

Optionally, in some implementations, the communication module 420 is specifically used for: receiving information of a resource for transmitting an uplink data channel sent by the network device; and using the target feedback mode to transmit the feedback information on the resource for transmitting the uplink data channel.

Optionally, in some implementations, the target feedback mode includes one of: feedback via an ACK/NACK of 1 bit for the TB, feedback via an ACK/NACK of 1 bit for multiple TBs, and feedback via a bitmap for part of or all CBs of the TB, wherein the multiple TBs include the TB.

Specifically, the terminal device 400 may correspond to the terminal device in the method 200 for transmitting feedback information according to the implementation of the present application, and the terminal device 400 may include entity units for performing the method performed by the terminal device in the method 200 in FIG. 2. In addition, various entity units and the other operations and/or functions described above in the terminal device 400 are respectively to realize the corresponding flows of the method 200 in FIG. 2, and will not be repeated here for the sake of brevity.

FIG. 5 is a schematic block diagram of a network device 500 according to an implementation of the present application. As shown in FIG. 5, the network device 500 includes a sending module 510 and a receiving module 520.

The sending module 510 is used for sending indication information to a terminal device, wherein the indication information is used for the terminal device to determine a target feedback mode for transmitting feedback information, and the feedback information is feedback information of the terminal device for receiving a transport block (TB) sent by the network device.

The receiving module 520 is used for receiving the feedback information transmitted by the terminal device using the target feedback mode.

Optionally, in some implementations, the indication information indicates at least one of: multiple feedback modes, a correspondence relationship between multiple ranges and multiple feedback modes, information of a format and/or a resource of a physical uplink control channel (PUCCH) used for transmitting the feedback information, and a feedback mode for transmitting the feedback information by the terminal device, wherein the multiple ranges are ranges of a number of code blocks (CBs) successfully received or failed to be received in one TB, or ranges of a proportion of CBs successfully received or failed to be received to a total number of CBs in one TB.

Optionally, in some implementations, the indication information indicates the multiple feedback modes, and the receiving module 520 is specifically used for: receiving the feedback information transmitted by the terminal device using a first feedback mode, wherein the first feedback mode is determined by the terminal device from the multiple feedback modes according to a reception situation of the TB.

Optionally, in some implementations, the indication information indicates a correspondence relationship between multiple ranges and multiple feedback modes, and the receiving module 520 is specifically used for: receiving the feedback information transmitted by the terminal device using a second feedback mode, wherein the second feedback mode is determined by the terminal device according to a first range and the correspondence relationship, the first range is a range corresponding to a first parameter, and the first parameter indicates a number of code blocks (CBs) successfully received or failed to be received in the TB, or a proportion of the CBs successfully received or failed to be received in the total number of CBs.

Optionally, in some implementations, the indication information indicates a feedback mode for the terminal device to transmit the feedback information, and the receiving module 520 is specifically used for: receiving the feedback information transmitted by the terminal device using the feedback mode for transmitting the feedback information indicated by the indication information.

Optionally, in some implementations, the indication information indicates information of a format and/or a resource of a PUCCH used for transmitting the feedback information, and the receiving module 520 is specifically used for: receiving the feedback information transmitted by the terminal device using a third feedback mode, wherein the third feedback mode is determined according to the information of the format and/or the resource of the PUCCH.

Optionally, in some implementations, the receiving module 520 is specifically used for: receiving feedback information fed back by the terminal device using an acknowledgement/negative acknowledgement (ACK/NACK) of 1 bit if the information of the format and/or the resource of the PUCCH indicates a format and/or a resource for transmitting one ACK/NACK; or receiving the feedback information fed back by the terminal device using an ACK/NACK of multiple bits if the information of the format and/or the resource of the PUCCH indicates formats and/or resources for transmitting multiple ACKs/NACKs.

Optionally, in some implementations, the sending module 510 is specifically used for: sending a high-layer signaling to the terminal device, wherein the high-layer signaling includes the indication information.

Optionally, in some implementations, the high-layer signaling is a radio resource control (RRC) signaling.

Optionally, in some implementations, the sending module 510 is further used for: sending information of a resource of a physical uplink control channel (PUCCH) for transmitting the feedback information to the network device, wherein the resource of the PUCCH is capable of transmitting the feedback information transmitted by the terminal device using any one of the multiple feedback modes.

The receiving module 520 is specifically used for: receiving the feedback information transmitted by the terminal device using the target feedback mode, includes: receiving, the feedback information transmitted by the terminal device using the target feedback mode on the resource of the PUCCH.

Optionally, in some implementations, the receiving module 520 is specifically used for: receiving the feedback information transmitted by the terminal device using the target feedback mode on a data channel and/or a control channel.

Optionally, in some implementations, the target feedback mode includes a first target feedback mode and a second target feedback mode, and the receiving module 520 is specifically used for: using the first target feedback mode to receive the feedback information transmitted by the terminal device on the data channel and using the second target feedback mode to transmit the feedback information on the control channel.

Optionally, in some implementations, the receiving module 520 is specifically used for: receiving the feedback information fed back by the terminal device using the first target feedback mode in a medium access control MAC control element (CE).

Optionally, in some implementations, the sending module 510 is further used for: sending information of a resource for transmitting an uplink data channel to the terminal device.

The receiving module 520 is specifically used for: using the target feedback mode to receive the feedback information transmitted by the terminal device on the resource for transmitting the uplink data channel.

Optionally, in some implementations, the target feedback mode includes one of: feedback via an ACK/NACK of 1 bit for the TB, feedback via an ACK/NACK of 1 bit for multiple TBs, and feedback via a bitmap for part of or all CBs of the TB, wherein the multiple TBs include the TB.

Specifically, the network device 500 may correspond to the network device in the method 300 for transmitting feedback information according to an implementation of the present application, and the network device 500 may include entity units for executing the method performed by the network device in the method 300 in FIG. 3. In addition, various entity units and the other operations and/or functions described above in the network device 500 are respectively in order to realize the corresponding flows of the method 300 in FIG. 3, and will not be described in detail herein for the sake of brevity.

Figure 6:
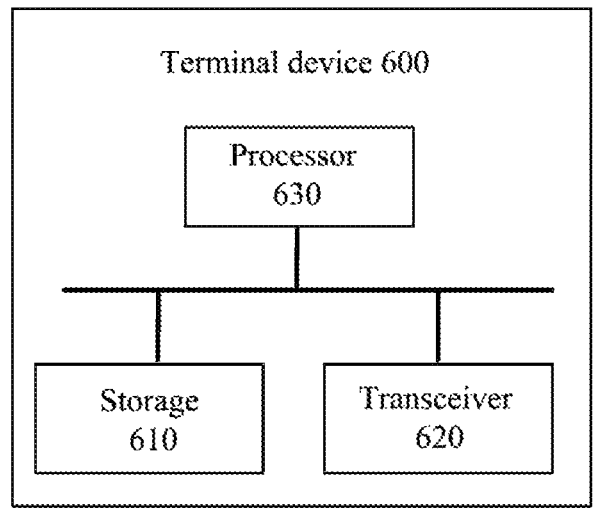
FIG. 6 is another schematic block diagram of a terminal device according to an implementation of the present application.

FIG. 6 is a schematic block diagram of a terminal device according to an implementation of the present application. The terminal device 600 of FIG. 6 includes a storage 610, a transceiver 620, and a processor 630. The storage 610 is used for storing a program, 620, the processor 630 is used for executing the program. When the program is executed, the processor 630 transmits and receives signals through the transceiver 620 and completes operations in the foregoing method implementations.

It should be understood that, in an implementation of the present application, the processor 630 may be a central processing unit (CPU), or the processor 630 may be other general purpose processors, a digital signal processor (DSP), an application specific integrated circuit (ASIC), an off-the-shelf programmable gate array (FPGA) or other programmable logic devices, a discrete gate or a transistor logic device, or a discrete hardware component, etc. The general purpose processor may be a microprocessor or the processor may be any conventional processor or the like.

The storage 610 may include a read-only memory and a random access memory, and provide instructions and data to the processor 630. A portion of storage 610 may also include a non-volatile random access memory. For example, the storage 610 may also store device type information.

In a realization process, acts of the methods described above may be accomplished by integrated logic circuits of hardware in the processor 630 or instructions in the form of software. The acts of the method disclosed in connection with the implementation of the present application may be directly embodied by the execution of the hardware processor, or by the execution of a combination of hardware and software modules in the processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware. In order to avoid repetition, it will not be described in detail here.

In a specific implementation, the determination module 410 in FIG. 4 may be implemented by the processor 630 of FIG. 6, and the communication module 420 in FIG. 4 may be implemented by the transceiver 620 of FIG. 6.

Figure 7:
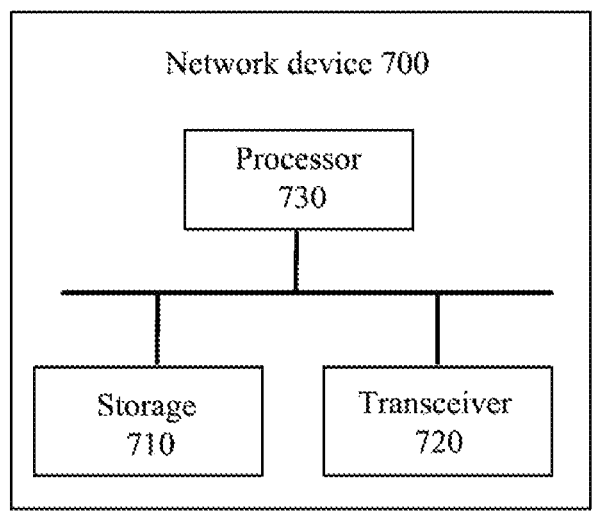
FIG. 7 is another schematic block diagram of a network device according to an implementation of the present application.

FIG. 7 is a schematic block diagram of a network device according to an implementation of the present application. The network device 700 of FIG. 7 includes a storage 710, a transceiver 720, and a processor 730. The storage 710 is used for storing a program, the processor 730 is used for executing the program, and the processor 730 is used for generating indication information when the program is executed.

It should be understood that, in an implementation of the present application, the processor 730 may be a central processing unit (CPU), or the processor 730 may be other general purpose processors, a digital signal processor (DSP), an application specific integrated circuit (ASIC), an off-the-shelf programmable gate array (FPGA) or other programmable logic devices, a discrete gate or a transistor logic device, or a discrete hardware component, etc. The general purpose processor may be a microprocessor or the processor may be any conventional processor or the like.

The storage 710 may include a read-only memory and a random access memory, and provide instructions and data to the processor 530. A portion of storage 710 may also include a non-volatile random access memory. For example, the storage 710 may also store device type information.

In a realization process, acts of the methods described above may be accomplished by integrated logic circuits of hardware in the processor 730 or instructions in the form of software. The acts of the method disclosed in connection with the implementation of the present application may be directly embodied by the execution of the hardware processor, or by the execution of a combination of hardware and software modules in the processor. The software modules may be located in a storage medium commonly used in the art, such as a random access memory, a flash memory, a read-only memory, a programmable read-only memory or an electrically erasable programmable memory, or a register. The storage medium is located in the memory, and the processor reads the information in the memory and completes the acts of the above method in combination with its hardware. In order to avoid repetition, it will not be described in detail here.

In a specific implementation, the sending module 510 and the receiving module 520 in FIG. 5 may be implemented by the transceiver 720 in FIG. 7.

Those of ordinary skill in the art will recognize that the exemplary units and algorithm acts described in connection with the implementations disclosed herein can be implemented in electronic hardware, or a combination of computer software and electronic hardware. Whether these functions are implemented in hardware or software depends on a specific application and design constraint of the technical solution. One skilled in the art may use different methods to realize the described functions for each particular application, but such realization should not be considered to be beyond the scope of the present application.

Those skilled in the art may clearly understand that for convenience and conciseness of description, the specific working process of the system, apparatus and unit described above may refer to the corresponding process in the aforementioned implementations of methods, and details are not described herein again.

In several implementations provided by the present application, it should be understood that the disclosed system, apparatus and method may be implemented in other ways. The apparatus implementations described above are only illustrative, for example, the division of the units is only a logical function division, and there may be other division manners in actual realization. For example, multiple units or components may be combined or integrated into another system, or some features may be ignored or not executed. On the other hand, the mutual coupling or direct coupling or communication connection shown or discussed may be indirect coupling or communication connection through some interfaces, devices or units, and may be in electrical, mechanical or other forms.

The units described as separated components may or may not be physically separated, and the component shown as a unit may or may not be a physical unit, i.e., it may be located in one place or may be allocated over multiple network units. Some or all of the units may be selected according to practical needs to achieve a purpose of the implementations.

In addition, various functional units in various implementations of the present application may be integrated in one processing unit, or various units may be physically located separately, or two or more units may be integrated in one unit.

The function may be stored in a computer readable storage medium if implemented in a form of software functional unit and sold or used as a separate product. Based on this understanding, the technical solution of the implementation of the present application, in essence, or the part contributing to the related art, or the part of the technical solution, may be embodied in the form of a software product stored in a storage medium, including several instructions for causing a computer device (which may be a personal computer, a server, or a network device, etc.) to perform all or part of the acts of the methods described in various implementations of the present application. The aforementioned storage media include U disk, mobile hard disk, read-only memory (ROM), random access memory (RAM), magnetic disk or optical disk, and other media capable of storing program codes.

The foregoing are merely exemplary implementations of the present application, but the protection scope of the present application is not limited thereto. Any person skilled in the art can easily conceive changes or substitutions within the technical scope disclosed by the present application, which should be included within the protection scope of the present application. Therefore, the protection scope of the present application should be subject to the protection scope of the claims.

I claim:

1. A method for transmitting feedback information, comprising:
   determining, by a terminal device, a target feedback mode used for transmitting feedback information according to a reception situation of a transport block (TB), wherein the feedback information is feedback information for the TB sent by a network device and received by the terminal device, wherein the target feedback mode is one of two feedback modes; and using, by the terminal device, the target feedback mode to transmit the feedback information,
wherein determining, by the terminal device, the target feedback mode according to the reception situation of the TB comprises:
when a proportion of CBs successfully received in the TB to a total number of CBs in the TB is greater than a first proportion threshold, the target feedback mode is feedback via a bitmap for the TB; and
when a proportion of CBs failed to be received in the TB to the total number of CBs in the TB is greater than a second proportion threshold, the target feedback mode is via an ACK/NACK of 1 bit for the TB.

2. The method according to claim 1, wherein the two feedback modes are preconfigured feedback modes.

3. The method according to claim 2, wherein the method further comprises:
receiving, by the terminal device, a high-layer signaling sent by the network device, wherein the high-layer signaling comprises the two feedback modes preconfigured by the network device.

4. The method according to claim 1, wherein determining, by the terminal device, the target feedback mode according to the first parameter, comprises:
determining, by the terminal device, a first range corresponding to the first parameter from a plurality of ranges, wherein the plurality of ranges are ranges of a proportion of CBs successfully received or failed to be received to a total number of CBs in one TB; and
determining, by the terminal device, the target feedback mode according to the first range and a preconfigured correspondence relationship between the plurality of ranges and the two feedback modes.

5. The method according to claim 4, wherein the method further comprises:
receiving, by the terminal device, a high-layer signaling sent by the network device, wherein the high-layer signaling includes the correspondence relationship preconfigured by the network device; and
receiving, by the terminal device, information of a resource of a physical uplink control channel (PUCCH) for transmitting the feedback information, sent by the network device, wherein the resource of the PUCCH is capable of transmitting the feedback information transmitted by the terminal device using any one of the two feedback modes;
wherein using, by the terminal device, the target feedback mode to transmit the feedback information, comprises:
using, by the terminal device, the target feedback mode to transmit the feedback information on the resource of the PUCCH.

6. The method according to claim 1, wherein determining, by the terminal device, the target feedback mode used for transmitting feedback information, comprises:
receiving, by the terminal device, indication information sent by the network device; and
determining, by the terminal device, the target feedback mode according to the indication information.

7. The method according to claim 6, wherein the indication information indicates information of at least one of a format and a resource of a physical uplink control channel (PUCCH) used for transmitting the feedback information; or the indication information indicates a feedback mode for the terminal device to transmit the feedback information;
when the indication information indicates the information of at least one of the format and the resource of the physical uplink control channel (PUCCH) used for transmitting the feedback information, wherein determining, by the terminal device, the target feedback mode according to the indication information, comprises determining, by the terminal device, the target feedback mode according to the information of the format and/or the resource of the PUCCH;
wherein using, by the terminal device, the target feedback mode to transmit the feedback information, comprises:
using the format and/or the resource of the PUCCH to transmit the feedback information;
wherein determining, by the terminal device, the target feedback mode according to the information of the format and/or the resource of the PUCCH, comprises:
determining, by the terminal device, that the target feedback mode is to adopt an acknowledgement/negative acknowledgement (ACK/NACK) of 1 bit for the TB if the information of the format and/or the resource of the PUCCH indicates a format and/or a resource for transmitting one ACK/NACK; or
determining, by the terminal device, that the target feedback mode is to adopt an ACK/NACK of a plurality of bits for the TB if the information of the format and/or the resource of the PUCCH indicates formats and/or resources for transmitting a plurality of ACKs/NACKs; and
when the indication information indicates the feedback mode for the terminal device to transmit the feedback information, wherein determining, by the terminal device, the target feedback mode according to the indication information, comprises: determining, by the terminal device, a feedback mode indicated by the indication information for transmitting the feedback information, as the target feedback mode.

8. The method according to claim 1, wherein using, by the terminal device, the target feedback mode to transmit the feedback information, comprises:
using, by the terminal device, the target feedback mode to transmit the feedback information on a data channel and/or a control channel;
when the target feedback mode comprises a first feedback mode and a second feedback mode, using, by the terminal device, the target feedback mode to transmit the feedback information on the data channel and/or the control channel, comprises:
using the first feedback mode to transmit the feedback information on the data channel and using the second feedback mode to transmit the feedback information on the control channel;
wherein using the first feedback mode to transmit the feedback information on the data channel, comprises:
using, by the terminal device, the first feedback mode for feedback in a medium access control (MAC) control element (CE).

9. A method for transmitting feedback information, comprising:
sending, by a network device, indication information to a terminal device, wherein the indication information is used for the terminal device to determine a target feedback mode for transmitting feedback information according to a reception situation of a transport block (TB), wherein the feedback information is feedback information of the terminal device for receiving the TB sent by the network device; and
receiving, by the network device, the feedback information transmitted by the terminal device using the target feedback mode, wherein the target feedback mode is determined by the terminal according to the reception situation of the TB, wherein when a proportion of CBs successfully received in the TB to a total number of CBs in the TB is greater than a first proportion threshold, the target feedback mode is feedback via a bitmap for the TB, and wherein when a proportion of CBs failed to be received in the TB to the total number of CBs in the TB is greater than a second proportion threshold, the target feedback mode is via an ACK/NACK of 1 bit for the TB.

10. The method according to claim 9, wherein the indication information is used for indicating at least one of:
the two feedback modes, a correspondence relationship between a plurality of ranges and the two feedback modes, information of a format and/or a resource of a physical uplink control channel (PUCCH) used for transmitting the feedback information, and a feedback mode for transmitting the feedback information by the terminal device, wherein the plurality of ranges are ranges of a number of code blocks (CBs) successfully received or failed to be received in one TB, or ranges of a proportion of CBs successfully received or failed to be received to a total number of CBs in one TB.

11. The method according to claim 10, wherein the indication information indicates the two feedback modes; wherein receiving, by the network device, the feedback information transmitted by the terminal device using the target feedback mode, comprises:
receiving, by the network device, the feedback information transmitted by the terminal device using a first feedback mode, wherein the first feedback mode is determined by the terminal device from the two feedback modes according to a reception situation of the TB;
when the indication information indicates the correspondence relationship between the plurality of ranges and the two feedback modes, receiving, by the network device, the feedback information transmitted by the terminal device using the target feedback mode, comprises: receiving, by the network device, the feedback information transmitted by the terminal device using a second feedback mode, wherein the second feedback mode is determined by the terminal device according to a first range and the correspondence relationship, the first range is a range corresponding to a first parameter, and the first parameter indicates a number of code blocks (CBs) successfully received or failed to be received in the TB, or a proportion of the CBs successfully received or failed to be received in the total number of CBs;
when the indication information indicates the feedback mode for transmitting the feedback information by the terminal device, receiving, by the network device, the feedback information transmitted by the terminal device using the target feedback mode, comprises: receiving, by the network device, the feedback information transmitted by the terminal device using the feedback mode for transmitting the feedback information indicated by the indication information; or
when the indication information indicates the information of the format and/or the resource of the PUCCH used for transmitting the feedback information, receiving, by the network device, the feedback information transmitted by the terminal device using the target feedback mode, comprises: receiving, by the network device, the feedback information transmitted by the terminal device using a third feedback mode, wherein the third feedback mode is determined according to the information of the format and/or the resource of the PUCCH.

12. The method according to claim 9, wherein sending, by the network device, the indication information to the terminal device, comprises:
sending, by the network device, a high-layer signaling to the terminal device, wherein the high-layer signaling includes the indication information, and the high-layer signaling is a radio resource control (RRC) signaling.

13. A terminal device, comprising:
a storage used for storing a program;
a processor used for executing the program, and when the program is executed, the processor is used for determining a target feedback mode used for transmitting feedback information according to a reception situation of a transport block (TB), wherein the feedback information is feedback information for the TB sent by a network device and received by the terminal device, wherein the target feedback mode is one of two feedback modes; and
a transceiver, used for using the target feedback mode to transmit the feedback information,
wherein when a proportion of CBs successfully received in the TB to a total number of CBs in the TB is greater than a first proportion threshold, the target feedback mode is feedback via a bitmap for the TB, and
wherein when a proportion of CBs failed to be received in the TB to the total number of CBs in the TB is greater than a second proportion threshold, the target feedback mode is via an ACK/NACK of 1 bit for the TB.

14. The terminal device according to claim 13, wherein the two feedback modes are preconfigured feedback modes.

15. The terminal device according to claim 14, wherein the transceiver is used for:
receiving a high-layer signaling sent by the network device, wherein the high-layer signaling comprises the two feedback modes preconfigured by the network device.

16. The terminal device according to claim 13, wherein the processor is used for:
determining a first range corresponding to the first parameter from a plurality of ranges, wherein the plurality of ranges are ranges of a proportion of CBs successfully received or failed to be received to a total number of CBs in one TB; and
determining the target feedback mode according to the first range and a preconfigured correspondence relationship between the plurality of ranges and the two feedback modes.

17. The terminal device according to claim 16, wherein the transceiver is used for:
receiving a high-layer signaling sent by the network device, wherein the high-layer signaling comprises the correspondence relationship preconfigured by the network device;
receiving information of a resource of a physical uplink control channel (PUCCH) for transmitting the feedback information, sent by the network device, wherein the resource of the PUCCH is capable of transmitting the feedback information transmitted by the terminal device using any one of the two feedback modes; and
using the target feedback mode to transmit the feedback information on the resource of the PUCCH.

18. The terminal device according to claim 13, wherein the transceiver is used for: receiving indication information sent by the network device;

wherein the processor is used for: determining the target feedback mode according to the indication information, wherein the indication information indicates information of a format and/or a resource of a physical uplink control channel (PUCCH) used for transmitting the feedback information, or the indication information indicates a feedback mode for the terminal device to transmit the feedback information;

when the indication information indicates the information of the format and/or the resource of the physical uplink control channel (PUCCH) used for transmitting the feedback information, the processor is used for determining the target feedback mode according to the information of the format and/or the resource of the PUCCH; the transceiver is used for using the format and/or the resource of the PUCCH to transmit the feedback information; the processor is used for determining that the target feedback mode is to adopt an acknowledgement/negative acknowledgement (ACK/NACK) of 1 bit for the TB if the information of the format and/or the resource of the PUCCH indicates a format and/or a resource for transmitting one ACK/NACK; or determining that the target feedback mode is to adopt an ACK/NACK of a plurality bits for the TB if the information of the format and/or the resource of the PUCCH indicates formats and/or resources for transmitting a plurality of ACKs/NACKs; or when the indication information indicates the feedback mode for the terminal device to transmit the feedback information, the processor is used for determining a feedback mode indicated by the indication information for transmitting the feedback information, as the target feedback mode.

19. The terminal device according to claim 13, wherein the transceiver is used for:

using the target feedback mode to transmit the feedback information on a data channel and/or a control channel;

when the target feedback mode comprises a first feedback mode and a second feedback mode, the transceiver is used for using the first feedback mode to transmit the feedback information on the data channel and using the second feedback mode to transmit the feedback information on the control channel;

wherein the transceiver is used for using the first feedback mode in a medium access control (MAC) control element (CE).

20. The terminal device according to claim 19, wherein the transceiver is used for:

receiving information of a resource for transmitting an uplink data channel sent by the network device; and using the target feedback mode to transmit the feedback information on the resource for transmitting the uplink data channel.

* * * * *